United States Patent
Birk et al.

(10) Patent No.: US 8,403,424 B2
(45) Date of Patent: Mar. 26, 2013

(54) VEHICLE PART ADJUSTING DEVICE

(75) Inventors: Karl Birk, Ebersbach (DE); Mark Mages, Alfdorf (DE)

(73) Assignee: TRW Automotive GmbH, Alfdorf (DE)

( * ) Notice: Subject to any disclaimer, the term of this patent is extended or adjusted under 35 U.S.C. 154(b) by 340 days.

(21) Appl. No.: 12/686,473

(22) Filed: Jan. 13, 2010

(65) Prior Publication Data
US 2010/0181819 A1  Jul. 22, 2010

(30) Foreign Application Priority Data

Jan. 20, 2009  (DE) .......................... 10 2009 005 205

(51) Int. Cl.
 *B60R 21/00* (2006.01)
 *B60R 22/00* (2006.01)
(52) U.S. Cl. ...................................... 297/480; 297/474
(58) Field of Classification Search ............... 297/463.1, 297/474, 480; 280/806
See application file for complete search history.

(56) References Cited

U.S. PATENT DOCUMENTS

| 4,116,402 | A  | * | 9/1978 | Nomura et al. | 242/377 |
| 5,588,677 | A  | * | 12/1996 | Kopetzky et al. | 280/806 |
| 6,340,176 | B1 | * | 1/2002 | Webber et al. | 280/806 |
| 6,390,562 | B1 | * | 5/2002 | Takamizu et al. | 297/483 |
| 2004/0212188 | A1 | * | 10/2004 | Terasaki | 280/806 |

FOREIGN PATENT DOCUMENTS

| DE | 3430455 | 2/1986 |
| DE | 10204940 | 9/2003 |
| DE | 102004036189 | 3/2006 |

* cited by examiner

*Primary Examiner* — Milton Nelson, Jr.
(74) *Attorney, Agent, or Firm* — Tarolli, Sundeim, Covell & Tummino LLP

(57) ABSTRACT

The invention relates to a vehicle part adjusting device (10), especially a belt buckle presenter or belt presenter, comprising a first elongated flexible push member (12), a second elongated flexible push member (14) and a connecting and separating means (16) for the push members (12, 14) which is designed so that it detachably connects the push members (12, 14) upon an adjusting movement of the push members (12, 14) in a first longitudinal direction ($X_1$) to form a bending-resistant interconnected part (18) and separates them upon an adjusting movement of the push members (12, 14) in an opposed second longitudinal direction ($X_2$), wherein the push members (12, 14) are connected and separated in a reversible manner.

30 Claims, 2 Drawing Sheets

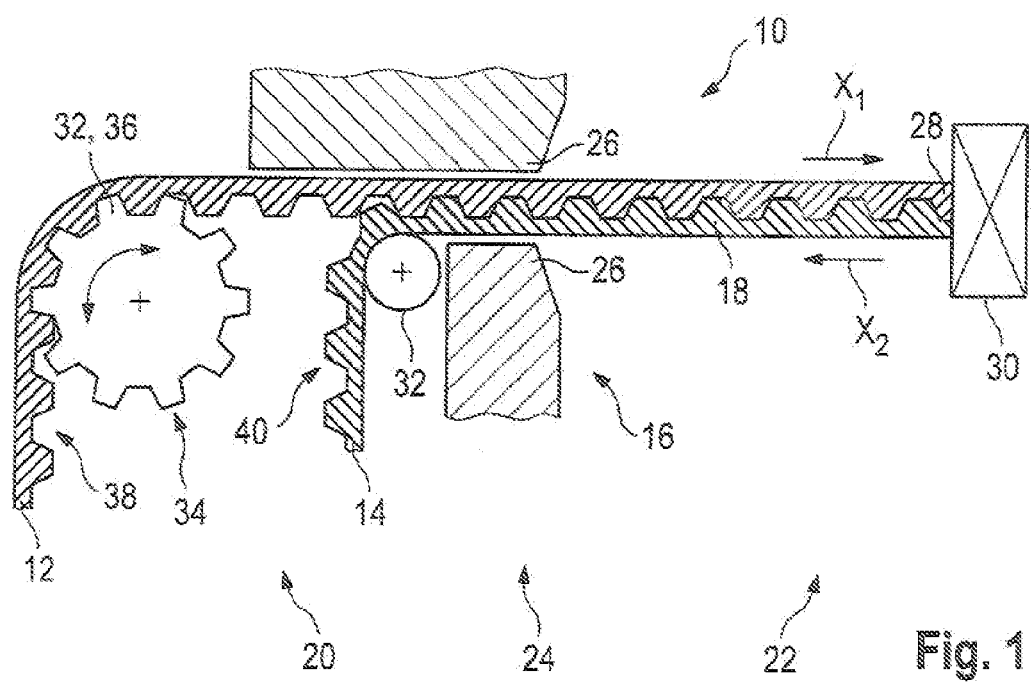
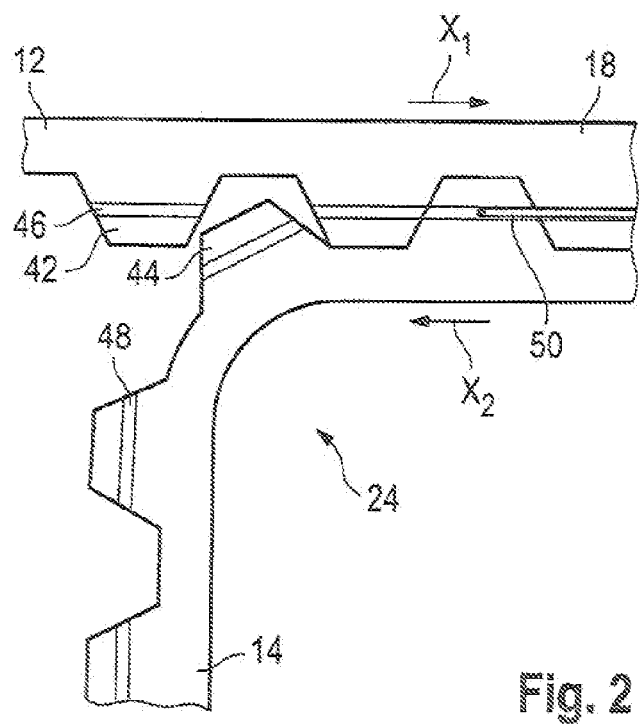

VEHICLE PART ADJUSTING DEVICE

RELATED APPLICATIONS

This application claims priority from German Patent Application No. DE 10 2009 005 205.4, filed Jan. 20, 2009, the entirety of which is incorporated herein by reference.

FIELD OF THE INVENTION

The invention relates to a vehicle part adjusting device, especially a belt buckle presenter or belt presenter.

BACKGROUND OF THE INVENTION

In vehicle construction, adjusting devices are used, for instance, to increase occupant convenience or to facilitate handling of operating parts mounted in the vehicle. After an occupant has entered the vehicle, current belt buckle presenters and belt presenters adjust a belt strap, a plug-in tongue of the belt strap or a buckle so that the occupant can more easily grab the plug-in tongue or the belt strap or readily find the slit in the buckle into which the plug-in tongue has to be inserted.

The adjusting device usually comprises a freely projecting, relatively bending-resistant arm, for instance, a steel rope which in an "extended position" adjusts a desired vehicle part, for instance, a plug-in tongue or a belt buckle, to adopt a handling position convenient to the vehicle occupant. After that the projecting arm is usually returned to a "retracted position" away from the interior of the vehicle.

The difficulty of those vehicle part adjusting devices resides in the fact that the projecting arm in the extended position should have as high a bending resistance as possible so as to be capable of adjusting the respective vehicle part in the desired manner. This impedes a space-saving accommodation of the arm.

It is the object of the invention to provide a vehicle part adjusting device which, on the one hand, is adapted to position an adjustable vehicle part with little effort and, on the other hand, can be stored in a space-saving and optically unobtrusive manner.

SUMMARY OF THE INVENTION in accordance with the invention, the object is achieved by a vehicle part adjusting device, especially a belt buckle presenter or belt presenter, comprising a first elongated flexible push member, a second elongated flexible push member, and a connecting and separating device for the push members designed to detachably interconnect the push members upon an adjusting movement of the push members in a first longitudinal direction to form a bending-resistant interconnected part and separate them from each other upon an adjusting movement of the push members in an opposite second longitudinal direction. The connecting and separating of the push members is performed reversibly. The bending-resistant interconnected part is formed in this adjusting device only in case of need, i.e. when the vehicle part is to adopt a desired adjusting position, whereas otherwise the interconnected part is provided separated in single components. The single components are elongated flexible push members which can be easily deformed in the longitudinal direction and, thus, can be stored in a space-saving manner. Elongated flexible push members are understood to be flexible transversely to the longitudinal direction, viz. can be elastically and/or plastically deformed transversely to the longitudinal direction without any high bending resistance. Compared to this, the interconnected part referred to as bending-resistant requires a comparatively great force to cause a deformation transversely to the longitudinal direction of the interconnected part. The bending resistance of the bending-resistant interconnected part is clearly above the sum of the bending resistances of the individual flexible push members of which the interconnected part is made. Push members which are oblong or ribbon-like in shape without necessarily having to extend linearly are referred to as "elongated". For instance, the portions of the elongated push members separated from each other can be bent or wound in the longitudinal direction due to their low bending resistance so as to permit a particularly unobtrusive and space-saving accommodation in the vehicle.

In a particularly preferred embodiment, the push members are substantially in shear connection in the longitudinal direction in the area of the interconnected part. Especially when the push members exhibit high shear strength in the longitudinal direction, the shear connection ensures a particularly distinct increase in the bending resistance when connecting the flexible push members.

The push members may have a profile on each of the longitudinal sides of the push members facing each other.

Preferably, the profiles of the push members are positive-locking in the area of the interconnected part, whereby a shear connection can be established between the push members with little effort. This can be effectuated, for instance, by undercuts and corresponding recesses or projections and corresponding depressions which simultaneously prevent or impede unintended release.

In a configuration variant the profiles of the push members engage in the area of the interconnected part such that the push members are interconnected normal to the adjusting movement. As a consequence, the interconnected part is protected against unintended release into the individual push members.

As an alternative or in addition, a locking element can be provided which can be detachably coupled to the first push member and the second push member so as to detachably interconnect the two push members. Also, this locking element serves for holding the interconnected part together and for preventing unintended separation into the push members.

In order to increase its tensile and/or compressive strength, at least one of the push members can include a flexible reinforcing element extending in the longitudinal direction of the push member. Such reinforcing element further increases the bending resistance of the interconnected part. The reinforcing element can protrude from the respective profiles in the longitudinal direction to strengthen the interconnection of the two push members and can engage in corresponding bores or recesses of the profiles belonging to the respective other push member.

Preferably, the connecting and separating means of the adjusting device comprises in a transition portion between the interconnected part and a separating portion of the push members a linear guide for the push members that causes movement of the push members toward each other when they are moved in the first longitudinal direction. This linear guide thus represents a simple and cheap possibility to unify the flexible push members into a bending-resistant interconnected part. In frequent cases, said linear guide moreover serves as support for the interconnected part, which is usually freely projecting and is merely held by the linear guide transversely to the longitudinal direction.

For reinforcing the interconnection of the two push members, the two sides facing each other can be provided with adhesion-reinforcing coatings or surface structures. It is also possible to magnetize the two push members or provide them with magnetic inserts so that unintended release is impeded or prevented.

A further embodiment of the vehicle part adjusting device provides a drive for adjusting the push members.

Preferably, the drive engages in the profile of at least one push member. The profile thus fulfils an advantageous double function; it is inserted in a separating portion of the push members for adjusting the push members or the interconnected part and, at the same time, substantially ensures a shear connection of the push members in the area of the interconnected part.

The bending-resistant interconnected part can especially be a freely projecting arm. The vehicle part to be adjusted is arranged at one free end of the interconnected part. The vehicle part is, for instance, a plug-in tongue, a belt strap or a belt buckle of a vehicle occupant restraint system.

The freely projecting arm can extend linearly or else is curved or bent. The latter is obtained by a geometric adaptation of the profiles.

Apart from the design of two push members, three or more push members can be reversibly interconnected, as a matter of course, to increase, for instance, the rigidity or to describe three-dimensional curves of the freely projecting arm.

Further advantageous and expedient configurations of the inventive idea are described in the subclaims. Additional details are illustrated in detail by way of the embodiments shown in the figures.

BRIEF DESCRIPTION OF THE DRAWINGS

FIG. 1 shows a schematic longitudinal section across a vehicle part adjusting device according to the invention;

FIG. 2 shows a schematic detail section across a transition portion of the vehicle part adjusting device according to a first embodiment;

DESCRIPTION OF EXAMPLE EMBODIMENTS

Figure 3:
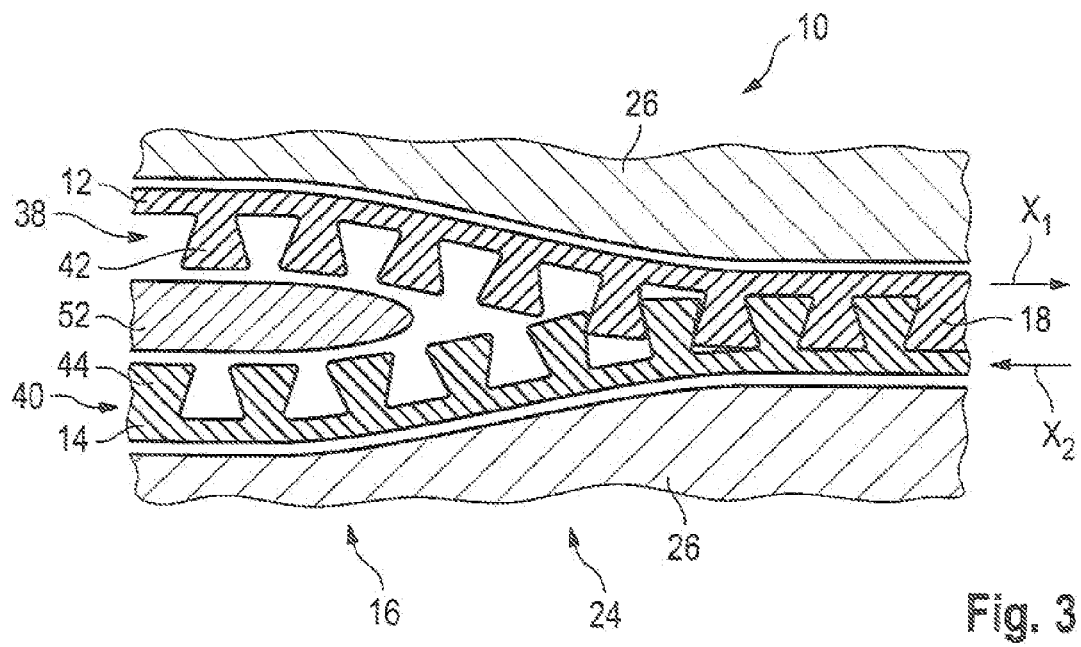
FIG. 3 is a schematic detail section across a transition portion of the vehicle part adjusting device according to a second embodiment.

FIG. 1 shows a vehicle part adjusting device 10 in accordance with a first embodiment, comprising a first elongated flexible push member 12, a second elongated flexible push member 14 and a connecting and separating means 16 for the push members 12, 14. The connecting and separating means 16 is designed so that it detachably interconnects the push members 12, 14 upon an adjusting movement of the push members 12, 14 in a first longitudinal direction $X_1$ to form a bending-resistant interconnected part 18 and separates them from each other upon an adjusting movement of the push members 12, 14 in an opposed second longitudinal direction $X_2$, wherein connecting and separating the push members 12, 14 is performed in a reversible manner.

Basically, three portions of the adjusting device 10 are visible, viz. a separating portion 20 in which the push members 12, 14 are separated and spaced apart from each other, an interconnecting portion 22 in which the push members 12, 14 are joined together to form the interconnected part 18, and a transition portion 24 between the separating portion 20 and the interconnecting portion 22 in which the means 16 for connecting or separating the push members 12, 14 is provided. In the embodiment according to FIG. 1, the connecting and separating means 16 includes mainly a linear guide 26 for the push members 12, 14 causing a movement of the push members 12, 14 toward each other when they are moved in the first longitudinal direction $X_1$. The linear guide 26 at the same time serves as support for the freely projecting bending-resistant interconnected part 18 at the free end 28 of which a vehicle part 30 to be adjusted is arranged. The vehicle part 30 may in particular be a belt buckle, a plug-in tongue or a belt strap so that the vehicle part adjusting device 10 is a belt buckle or belt presenter. As a matter of course, other vehicle parts 30 to be adjusted can be moved by the adjusting device 10 according to FIG. 1.

For assisting the linear guide 26 and for reducing the friction during the adjusting movement in the first or second longitudinal direction $X_1$, $X_2$, the connecting and separating means 16 may additionally exhibit deflection means 32 for deflecting the push members 12, 14 transversely to the longitudinal direction $X_1$, $X_2$.

Moreover, a drive 34 is provided to adjust the push members 12, 14 in the first or second longitudinal direction $X_1$, $X_2$. In the embodiment according to FIG. 1, one of the deflection means 32 of the adjusting device 10 is in the form of a drive wheel 36 of the drive 34. In the shown embodiment, the push members 12, 14 remain interconnected at the free end 28 even when the push members 12, 14 or the interconnected part 18 are maximally adjusted, e.g. up to a stop at the linear guide 26 in the direction $X_2$. Thus, a drive 34 that directly drives only one of the push members 12, 14 is sufficient.

Each push member 12, 14 is, considered per se, flexible and shear-strong at least in the longitudinal direction X. This means that the push members 12, 14 can absorb shear forces in the longitudinal direction X while the deformation is negligible, whereas already low bending forces result in considerable deformations in the longitudinal direction X. Due to this flexibility and deformability, the deflection by means of deflection means 32 is possible in a particularly simple manner. Accordingly, the separated push members 12, 14 can be stored in a simple, compact, and optically unobtrusive manner. Depending on the field of use of the adjusting device 10, it may be advantageous if only one of the push members 12, 14 is designed to be shear-resistant, while the other push member 12, 14 exhibits high tensile strength but no or hardly any shear strength. The interconnected part 18 formed when connecting the push members 12, 14 then has a high bending resistance merely in one load direction (upwards or downwards according to FIG. 1), whereas it remains flexible in the opposite direction.

It is of particular advantage for adjusting vehicle parts 30 when the elongated push members 12, 14 have a ribbon-like design.

In the area of the interconnected part 18 formed by connection between the push members 12, 14, a particularly high bending resistance is obtained if the connection of the push members 12, 14 is substantially shear-resistant. Such a shear-resistant connection can be obtained in an especially simple manner by profiling the push members 12, 14. In accordance with FIG. 1, the push members 12, 14 are provided with a respective profile 38, 40 at longitudinal sides of the push members 12, 14 facing each other and engaging each other in the area of the interconnected part 18.

In the embodiment according to FIG. 1, the problem of force transmission between the drive 34 and the push members 12, 14 or the interconnected part 18 is solved in a particularly advantageous manner, namely, because the drive 34, and more exactly the drive wheel 36, engages in the profile 38, 40 of at least one of the push members 12, 14. Such drive construction especially minimizes undesired slip occurring between the drive wheel 36 and the driven first push member 12.

FIG. 2 shows a schematic detail cut-out of FIG. 1 in the area of the transition portion 24. By way of FIG. 2, it is emphasized that the profiles 38, 40, viewed in longitudinal direction X, are formed by substantially trapezoidal projections 42, 44. The space between two projections 42, 44 of a push member 12, 14 is exactly complementary to the projection 44, 42 of the other push member 12, 14 so that the profiles 38, 40 of the push members 12, 14 are positive-locking in the area of the interconnected part 18. The connection of the push members 12, 14 in this way is substantially shear-resistant. In terms of geometry, the first and second push members 12, 14 are formed substantially identically, which has a particularly advantageous effect on the manufacturing costs of the adjusting device 10.

According to FIG. 2, in the projections 42, 44 lateral grooves 46, 48 are provided which form a continuous groove passage in the area of the bending-resistant interconnected part 18.

In the configuration variant according to FIG. 2, a locking element 50 is provided which can be detachably coupled to the first push member 12 and the second push member 14 so as to detachably connect the two push members 12, 14. The locking element 50 is a wire, for instance, which is introduced into the groove passage or guided out of the groove passage in the area of the connecting and separating means 16. The locking element 50 is fed in the transition portion 24 (according to FIG. 2 normal to the plane of projection) and prevents the profiles 38, 40 of the push members 12, 14 from being separated in the interconnecting portion 22 by a relative movement normal to the longitudinal direction (a vertical relative movement according to FIG. 2). In other words, the locking element 50 secures the connection between the push members 12, 14 in the area of the interconnected part 18.

FIG. 3 shows the detail cut-out according to FIG. 2 in an alternative second embodiment of the vehicle part adjusting device 10. The basic structure and the general operating mode are not different from the first embodiment according to FIGS. 1 and 2, which is why reference is made to the foregoing description in this respect. The substantial difference resides in the profiling of the push members 12, 14, the profiles 38, 40 in both embodiments being formed by approximately trapezoidal projections 42, 44. While the projections 42, 44 according to FIG. 2 are tapered toward their free ends, however, the free ends of the projections 42, 44 according to FIG. 3 are enlarged. Since a zipper-type connection is brought about between the push members 12, 14, the profiles 38, 40 of the push members 12, 14 are also referred to as zipper profiles. The zipper-type profiles 38, 40 of the push members 12, 14 engage in the area of the interconnected part 18 so that the push members 12, 14 are interconnected normal to the adjusting movement (in the vertical direction according to FIG. 3). In addition, the nature of profiles 38, 40 of the push members 12, 14 can also be such that the push members 12, 14 are also interconnected normal to the plane of projection and, thus, equally normal to the adjusting movement.

In order to interconnect or separate the zipper-type profiles 38, 40, the push members 12, 14 have to be fed and discharged in the transition portion 24 between the interconnecting portion 22 and the separating portion 20 at a predetermined angle depending on the geometry of the profiles 38, 40. For this reason, the connecting and separating means 16 according to FIG. 3 additionally includes, apart from the linear guide 26, a spacer 52 disposed between the two push members 12, 14 and separating the same from each other upon movement in the second longitudinal direction $X_2$. Upon movement in the first longitudinal direction $X_1$, the push members 12, 14 are fed by the linear guide 26 and the spacer 52 such that the trapezoidal projections 42, 44 in longitudinal direction can engage, although the dimension in the longitudinal direction X at the free end of a trapezoidal projection 42, 44 is larger than the minimum distance of two opposed projections 44, 42 in the longitudinal direction X.

Figure 4:
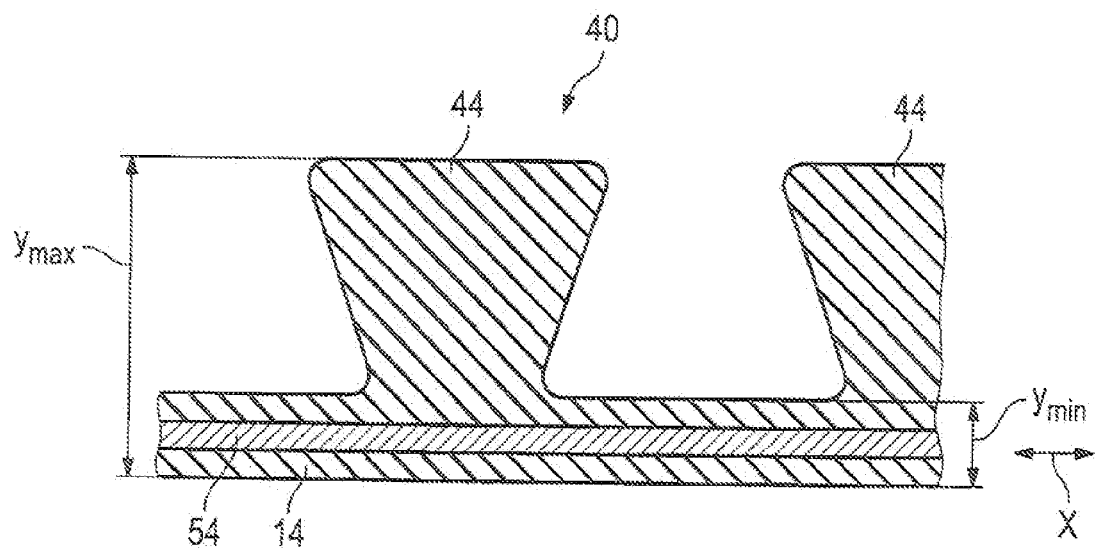
FIG. 4 is a schematic detail section across a push member of the vehicle part adjusting device according to the invention.

FIG. 4 shows the second push member 14 according to FIG. 3 in detail. The profile 40 is formed by projections 44 integrally formed with the associated second push member 14. As an alternative, it is also imaginable, of course, that a pre-fabricated profile 40 or even single separate projections 44 are attached to a ribbon-like carrier so as to form the push member 14.

In accordance with FIG. 4, in order to increase its tensile and/or compressive strength the second push member 14 includes a flexible reinforcing element 54 extending in longitudinal direction of the push member 14. The reinforcing element 54 can be, for instance, a metal reinforcement, especially a metal wire being passed in the longitudinal direction X. Alternatively, a fiber reinforcement such as carbon or glass fibers. The push members 12, 14 exhibit preferably profiled longitudinal sides facing each other, the reinforcing element 54 being preferably arranged at a marginal portion of the push member 12, 14 opposed to the longitudinal side.

In a specific embodiment, the reinforcing element 54 is electrically conductive, whereby current or electric signals can be transmitted to the vehicle part 30 to be adjusted. For instance, a limit switch can be activated or a lit belt buckle or a lit belt presenter can be realized. In this case the reinforcing element 54 preferably is a metal wire. In order to produce a current circuit, a respective electrically conducting reinforcing element 54 can be positioned in both push members 12, 14. As an alternative, two reinforcing elements 54 spaced apart from each other and extending parallel to each other in the longitudinal direction X can be in one of the push members (12, 14). In another alternative configuration, it is also imaginable that the reinforcing element 54 comprises at least two metal wires electrically shielded against each other which are twisted or braided e.g. like a rope, and both form a mechanical reinforcement of the push member 12, 14 and ensure a power supply of the vehicle part 30 to be adjusted.

The second push member 14 has a minimum construction height $y_{min}$ between the projections 44. The reinforcing element 54 extends preferably centrally, i.e. in the area of the neutral fiber (in the case of vertical longitudinal bending). Due to the small construction height and the central position of the reinforcing element 54, low bending resistance occurs in the area between the projections 44, which in total results in a flexible behavior of the entire push member 14. In the area of the projections 44, the push member 14 has a maximum construction height $y_{max}$. If the first push member 12 is formed to be identical with the second push member 14, the interconnected part 18 has a constant construction height $h=y_{min}+y_{max}$. Due to the shear-resistant connection between the profiles 38, 40, the interconnected part 18 composed of two push members 12, 14 acts like a one-piece component part when bent vertically. The neutral fiber in turn extends centrally with $h=(y_{max}+y_{min})/2$ so that a compression or tension flange is formed in the area of the reinforcing elements 54. This results in a high bending resistance and a high bending strength of the interconnected part 18.

The bigger the difference between $y_{max}$ and $y_{min}$, the bigger the difference between the bending resistance of a single push member 12, 14 compared to that of the interconnected part 18.

Preferably $y_{max}$ is at least twice as high as $y_{min}$, wherein especially preferably $y_{max} > 3 y_{min}$.

The bending resistance considered here will be the vertical bending resistance in the usual applications (cf. Figures). The horizontal bending resistance in the longitudinal direction can be adjusted, for instance, via the width of the ribbon-like elongated push members 12, 14.

The invention claimed is:

1. A vehicle part adjusting device for a belt buckle presenter or belt presenter, comprising
    a first elongated flexible push member (12),
    a second elongated flexible push member (14) and
    a connecting and separating means (16) for the push members (12, 14) which is designed so that it detachably interconnects the push members (12, 14) during an adjusting movement of the push members (12, 14) in a first longitudinal direction ($X_1$) to form a bending-resistant interconnected part (18) and separates them from each other during an adjusting movement of the push members (12, 14) in an opposed second longitudinal direction ($X_2$),
    wherein connecting and separating of the push members (12, 14) is performed reversibly.

2. A vehicle part adjusting device according to claim 1, wherein at least one of the push members (12, 14) is designed to be shear-resistant in the longitudinal directions ($X_1, X_2$).

3. A vehicle part adjusting device according to claim 1, wherein the push members (12, 14) are ribbon shaped.

4. A vehicle part adjusting device according to claim 1, wherein the push members (12, 14) are interconnected in a substantially shear-resistant manner in the area of the interconnected part (18) in the longitudinal directions ($X_1, X_2$).

5. A vehicle part adjusting device according to claim 1, wherein the first push member (12) and the second push member (14) are formed to be geometrically identical.

6. A vehicle part adjusting device according to claim 1, wherein in a transition portion (24) between the interconnected part (18) and a separating portion (20) of the push members (12, 14) the connecting and separating means (16) comprises a linear guide (26) for the push members (12, 14) which causes a movement of the push members (12, 14) toward each other when they are moved in the first longitudinal direction ($X_1$).

7. A vehicle part adjusting device according to claim 1, wherein in a transition portion (24) between the interconnected part (18) and a separating portion (20) of the push members (12, 14) the connecting and separating means (16) comprises a spacer (52) arranged between the two push members (12, 14) and separating the latter from each other upon movement in the second longitudinal direction ($X_2$).

8. A vehicle part adjusting device according to claim 1, wherein a locking element (50) is provided which extends through the first push member (12) and the second push member (14) so as to detachably interconnect the two push members (12, 14).

9. A vehicle part adjusting device according to claim 1, wherein the bending-resistant interconnected part (18) is in the form of a freely projecting arm, wherein a vehicle part (30) to be adjusted is arranged at a free end (28) of the interconnected part (18).

10. A vehicle part adjusting device according to claim 1, wherein the connecting and separating means interconnects the first and second push members to prevent relative movement between the first and second push members.

11. A vehicle part adjusting device according to claim 1, wherein the interconnected part has a first bending resistance in a first bending direction perpendicular to the longitudinal directions and a second, different bending resistance in a second bending direction opposite the first bending direction.

12. A vehicle part adjusting device according to claim 1, wherein the first push member pushes the second push member in the first longitudinal direction, the first push member pulling the second push member in the second longitudinal direction.

13. A vehicle part adjusting device according to claim 1, wherein the first push member and the second push member move simultaneously in the first direction and move simultaneously in the second direction.

14. A vehicle part adjusting device according to claim 1, wherein the first push member engages the second push member such that movement of the first push member in the first longitudinal direction causes the second push member to move in the first longitudinal direction.

15. A vehicle part adjusting device according to claim 14, wherein movement of the first push member in the second longitudinal direction causes the second push member to move in the second longitudinal direction.

16. A vehicle part adjusting device according to claim 1, wherein at least either of the push members (12, 14) includes a flexible reinforcing element (54) extending in the longitudinal directions ($X_1, X_2$) of the push member (12, 14) to increase its tensile and/or compressive strength.

17. A vehicle part adjusting device according to claim 16, wherein in the area of the interconnected part (18) the push members (12, 14) have longitudinal sides facing each other, wherein the reinforcing element (54) is arranged at a marginal portion of the push member (12, 14) opposed to said longitudinal side.

18. A vehicle part adjusting device according to claim 16, wherein the reinforcing element (54) is electrically conductive.

19. A vehicle part adjusting device according to claim 18, wherein the reinforcing element (54) is an electric line and can be used for a power supply of a vehicle part (30) to be adjusted.

20. A vehicle part adjusting device according to claim 1, wherein the push members (12, 14) are profiled (38, 40).

21. A vehicle part adjusting device according to claim 20, wherein each of the push members (12, 14) has a profile (38, 40) at longitudinal sides of the push members (12, 14) facing each other.

22. A vehicle part adjusting device according to claim 20, wherein the profiles (38, 40) are zipper-type profiles.

23. A vehicle part adjusting device according to claim 20, wherein the profiles (38, 40), viewed in the longitudinal directions ($X_1, X_2$), are formed by substantially trapezoidal projections (42, 44).

24. A vehicle part adjusting device according to claim 20, wherein the profiles (38, 40) of the push members (12, 14) are positive-locking in the area of the interconnected part (18).

25. A vehicle part adjusting device according to claim 24, wherein the profiles (38, 40) of the push members (12, 14) engage in the area of the interconnected part (18) such that the push members (12, 14) are interconnected normal to the adjusting movement.

26. A vehicle part adjusting device for a belt buckle presenter or belt presenter, comprising
    a first elongated flexible push member (12),
    a second elongated flexible push member (14), each of the push members (12, 14) being profiled (38, 40),
    a drive (34) that engages in the profile (38, 40) of at least one push member (12, 14), and
    a connecting and separating means (16) for the push members (12, 14) which is designed so that it detachably interconnects the push members (12, 14) during an adjusting movement of the push members (12, 14) in a first longitudinal direction ($X_1$) to form a bending-resistant interconnected part (18) and separates them from each other during an adjusting movement of the push members (12, 14) in an opposed second longitudinal direction ($X_2$), wherein connecting and separating of the push members (12, 14) is performed reversibly.

27. A vehicle part adjusting device for a belt buckle presenter or belt presenter, comprising a first elongated flexible push member (12), a second elongated flexible push member (14), the push members (12, 14) having profiles (38, 40) formed by projections (42, 44) integrally formed with the respective push member (12, 14), and a connecting and separating means (16) for the push members (12, 14) which is designed so that it detachably interconnects the push members (12, 14) during an adjusting movement of the push members (12, 14) in a first longitudinal direction ($X_1$) to form a bending-resistant interconnected part (18) and separates them from each other during an adjusting movement of the push members (12, 14) in an opposed second longitudinal direction ($X_2$), wherein connecting and separating of the push members (12, 14) is performed reversibly.

28. A vehicle part adjusting device according to claim 1, wherein a drive (34) for adjusting the push members (12, 14) is provided.

29. A vehicle part adjusting device for a belt buckle presenter or belt presenter, comprising a first elongated flexible push member (12), a second elongated flexible push member (14), a connecting and separating means (16) for the push members (12, 14) which is designed so that it detachably interconnects the push members (12, 14) during an adjusting movement of the push members (12, 14) in a first longitudinal direction ($X_1$) to form a bending-resistant interconnected part (18) and separates them from each other during an adjusting movement of the push members (12, 14) in an opposed second longitudinal direction ($X_2$), and deflection means (32) which deflect the push members (12, 14) transversely to the longitudinal directions ($X_1$, $X_2$), wherein connecting and separating of the push members (12, 14) is performed reversibly.

30. A vehicle part adjusting device according to claim 29, wherein at least one of the deflection means (32) is a drive wheel (36).

* * * * *